July 30, 1929.  F. W. MANNING ET AL  1,722,808
MAGAZINE FILTER
Filed Nov. 19, 1925  3 Sheets-Sheet 1

Inventors
FRED. W. MANNING & HORACE L. HIRSCHLER
By Dewey, Strong, Townsend & Loftus.
Attorneys July 30, 1929.   F. W. MANNING ET AL   1,722,808

MAGAZINE FILTER

Filed Nov. 19, 1925   3 Sheets-Sheet 2

Inventors
FRED. W. MANNING & HORACE L. HIRSCHLER
By Dewey, Strong, Townsend & Loftus.
Attorneys Inventors
FRED W. MANNING & HORACE L. HIRSHLER
By Dewey, Strong, Townsend & Loftus.
Attorneys.

Patented July 30, 1929.

1,722,808

UNITED STATES PATENT OFFICE.

FRED W. MANNING, OF BERKELEY, AND HORACE L. HIRSCHLER, OF SAN FRANCISCO, CALIFORNIA, ASSIGNORS, BY DIRECT AND MESNE ASSIGNMENTS, TO STEWART-WARNER CORPORATION, OF CHICAGO, ILLINOIS, A CORPORATION OF VIRGINIA.

MAGAZINE FILTER.

Application filed November 19, 1925. Serial No. 70,111.

This invention relates to the treatment of liquids for effecting their purification or other desired improvements in their characteristics; but more particularly it relates to the continuous purification of motor oils of internal combustion engines, during operation by filtration, distillation and other treatment. The present application is directed to the construction for filtration only, the other features of the total invention, which are physically associated so that they are necessarily shown and which are therefore partly described herein, being made the subject of a division of this application.

Lubricating oils of moving vehicles very quickly become contaminated with solid particles such as road dust, metal and carbon particles, and the abrasive action of these impurities is often accentuated by dilution of the lubricating oil caused by the addition of fuel oil entrained with the explosive mixture or which condenses out of the mixture when the engine is cold in starting, or by the addition of water resulting chiefly from the condensation of the burned gases especially when the engine is cold. The liquid fuel and water leak past the pistons and may carry down into the crank case more or less of the soild impurities, the remainder of which solid impurities enter the lubricating system through the breather and from other sources.

The constant wear on the engine parts due to the contamination of crank case oil of motor vehicles has been relieved to some extent by the use of various types of filters. However, these have not been found to be very satisfactory, as they have been of the intermittent pressure type and their filtering fabrics, being relatively limited as to filter area, quickly become clogged with impurities or become impervious due to being swollen by water particles resulting in constantly changing filtering rates and filtering pressures, and moreover the clarity obtained after a filter has been in use for any period of time cannot be obtained earlier in that period. The ultimate result is the replacement of either the filtering fabric or the complete filter which, because of the attendant inconvenience or expense, is often neglected.

Previous applications filed October 1, 1925, Serial Number 59,787; October 22, 1925, Serial Number 64,247; and October 24, 1925 Serial Number 64,495, describe how the total area of fabric in a filter chamber for filtering purposes may be greatly increased and made easily replaceable at little cost, and how a uniform filtering rate and pressure and a standard clarity may be maintained by means of a magazine type of filter in which the filtering fabric in the form of a belt is fed at a predetermined rate of speed from a supply spool over a moving filter member onto a storage spool by means of motor or engine transmission drive. In the present application we describe how such a filter may be operated independently of any force except the pressure of the liquid itself, and how instead of the rate of supply of fresh filtering fabric or surface being dependent on the speed of the engine or separate motor, it may be made in direct ratio to the rate of exhaustion of the filtering fabric or amount of cake solids built upon the filtering surface. We also describe how the viscosity of the lubricating oil may be kept constant by suitably regulating its temperature and by eliminating the fuel and water contamination by vaporization or distillation, the elimination of the latter considerably increasing the life of the filter fabric.

In accordance with the present invention the lubricating oil to be purified by distillation and filtration may be pumped to a heater from any suitable source of supply such as the crank case or other reservoir for receiving the lubricant escaping from the lubricated parts of the engine or other machinery. It will be understood that the heating of the oil, in addition to incidentally separating from it by distillation the more volatile gasoline with which it may have become impregnated in its passage through the engine, serves the very important purpose of reducing the viscosity and density of the oil, rendering it more easily separable from solid impurities by the mechanical process of filtration, and facilitating the passage of the oil through the filtering element of whatever sort. The heater may comprise a stove surrounding the exhaust manifold of an engine or a coil passing around or through the manifold or other suitable device which will heat the oil to the required temperature and the temperature may be thermostatically controlled. The oil after being heated passes into the bottom of the filter chamber, through a filtering belt into a filtrate receiving drum which supports and carries the belt, through a pipe connection from the drum to a vaporizing chamber where it is intimately mixed with air so that the objectionable lighter fractions or diluents and water vapor are promptly carried off. To prolong the contacts of the vapors, oil and air, one or more baffle plates may be placed in the vaporizing chamber to force the fluid mixture to follow a devious path. The resulting vaporized water and fuel oil is carried to the air intake of the carburetor and the lubricating oil returns to the crank case by gravity through a cooler, which may be thermostatically controlled. The heating of the oil greatly increases its rate of filtration as well as the rate at which the water and fuel oil may be vaporized, especially when subject to agitation or spraying in a vacuum. The vacuum not only aids in vaporizing the diluents but aids the pump pressure in filtration. However if more than a slight vacuum is maintained in the vaporizing chamber, a float arrangement must be incorporated or else the lubricating oil must be removed by pump pressure.

Further, in accordance with this invention the filtering fabric is moved forward by means of a liquid-operated motor operated by the oil by-passing through a relief valve into the vaporization chamber due to increase of pressure resulting from clogging of the filtering fabric, or the increase in pressure may be used to actuate the motor through a pressure diaphragm without any by-passing of the oil. The liquid-operated motor may comprise a reciprocating piston having a return spring, pawl and ratchet or a pump with impellers or other equivalent device, and by means of suitable gearing it may be made sufficiently sensitive to cause the filtering fabric to move forward at the slightest increase in pressure. If water exists in the lubricant oil, its entrance into the bottom of the filter chamber in proximity to the end of the by-pass pipe will cause it to be by-passed into the vaporizing chamber the moment the lower portion of the filtering fabric tends to become impervious due to the fabric swelling under action of the water.

Still further, in accordance with this invention a scraper is provided in the bottom and at one side of the filter chamber so that in case of heavy sludge gathering on the filter cloth it may be scraped off and will settle into the sump from which it may be cleaned out from time to time as occasion requires, and in this way the life of the storage spool may be prolonged.

The features of the invention hereinbefore referred to in general terms will be better understood by reference to the following description, taken in conjunction with the accompanying drawings which illustrate a preferred form of apparatus for carrying out our invention.

Figure 1:
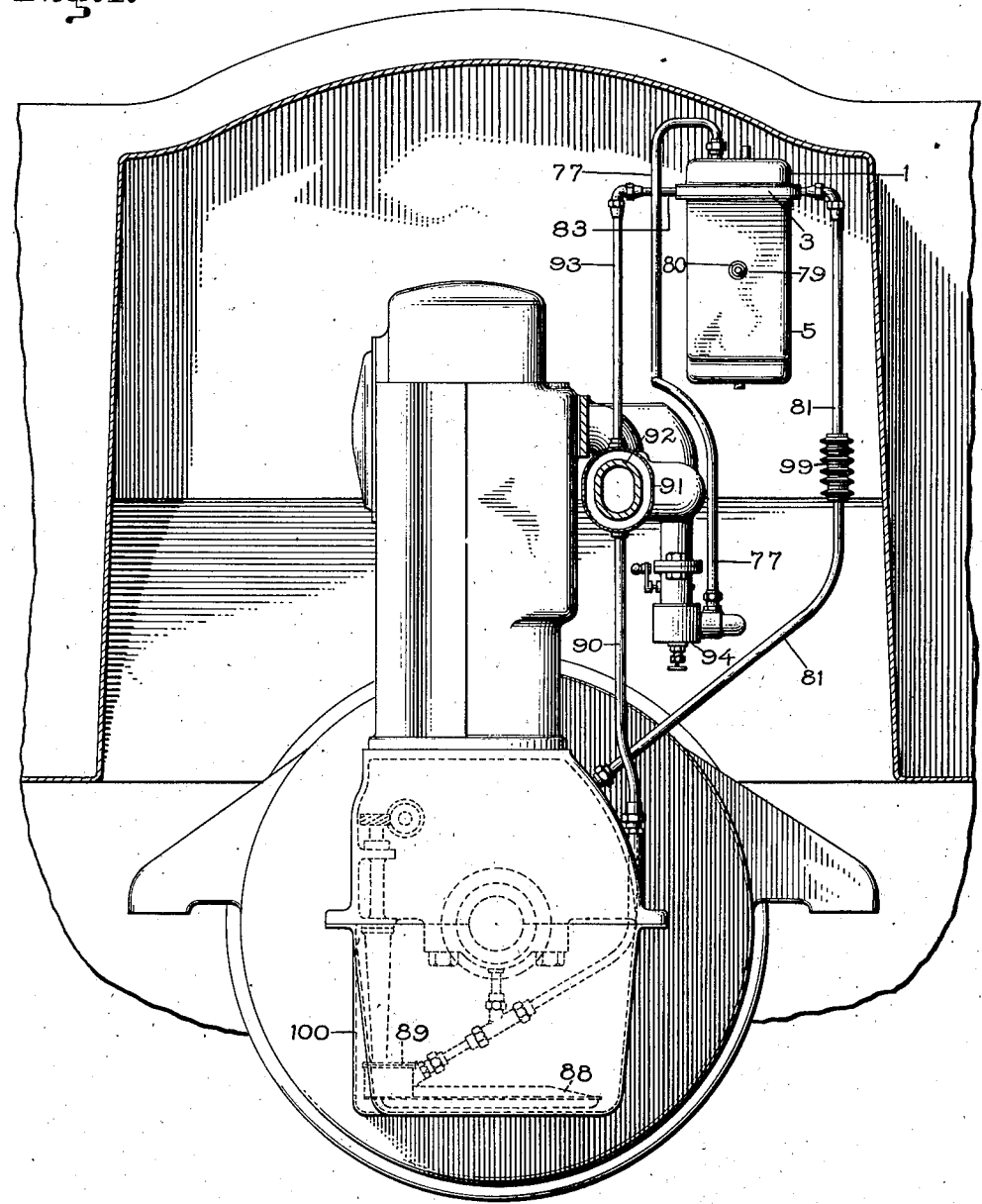
Figure 1 is a front elevation of the dash of a motor vehicle showing relative positions of filter and vaporizer with engine.

The apparatus as shown in Figs. 1, 2, 3 and 4 consists of vaporizing chamber 1, base plate 3, which also forms the cover plate for filter chamber 5, the lower end of which is dished to form a sump having a clean out plug 6. Vaporizing chamber, base plate and the filter chamber have soft packing between their joints and are firmly held together by four long bolts 7 and four short bolts 9.

Enclosed in the filter chamber is supply spool 11, storage spool 13, and perforated filter drum 15 with filtering belt 17 passing from the supply spool around the drainage screen 16 encircling the filter drum to the storage spool 13 as indicated by the arrows. Supply spool 11 is kept under a slight tension by a cupped washer or spring not shown so that no slack in the filtering belt may occur and is fastened on shaft 21 by means of a pin not shown, which allows the shaft to be withdrawn for changing the spools, and the shaft turns in bushings 23 driven into supporting arms 25 and 26 fastened to cover plate 3. Storage spool 13 is fastened on shaft 27 in similar manner to the supply spool on its shaft, and turns freely in bushing 29 also driven into supporting arms 25 and 26. Filter drum 15 and end plates 31 and 33 are rigidly fastened together and turn freely on perforated filtrate outlet pipe 35 which ties the lower ends of supporting arms 25 and 26 together. Felt washers between the end plates and the supporting arms prevent the passage of unfiltered oil into the drum. Closure part 37 extending from side to side of the filter chamber 5 across the surface of the filter drum prevents passage of the unfiltered oil into the drum through that portion of the drum not covered by the filtering belt 17. A scraper 38 may be used to prevent any solids from clinging to the filtering fabric altho at times it may be advisable to wind up solids in the filtering belt into the storage spool.

The liquid-operated motor as shown consists of a pair of gear rotors 39 and 41 turning in a housing 42 in the cover plate 3. Rotor 41 drives the storage spool through worm 43, worm gear 45, worm 47, worm gear 49, worm 51 and worm gear 53 attached to the end of the storage spool shaft. Adjoining the housing for the gear rotors is a relief valve chamber 54 also formed in the cover plate, containing relief valve 55 tensioned by spring 57 made accessible through cap 59. Communicating with the valve chamber is a passage 63 connecting with filtrate pipe 65 and also a pipe 67 leading into the vaporizing chamber into which both filtrate and by-passed liquid is sprayed on underside of baffle plate 69 by means of spray disc 71 tensioned by spring 73. Breather 75 filled with metallic wool provides for the entrance of the air which with the vapors is drawn by a slight vacuum through connection 77 to the air intake of the carburetor. The lubricating oil returns to the crank case by gravity through opening 78 and pipe 81. Pipes 83 and 85 carry the oil into the bottom of the filter and pipe 87 by-passes the oil into the vaporizing chamber.

Figure 2:
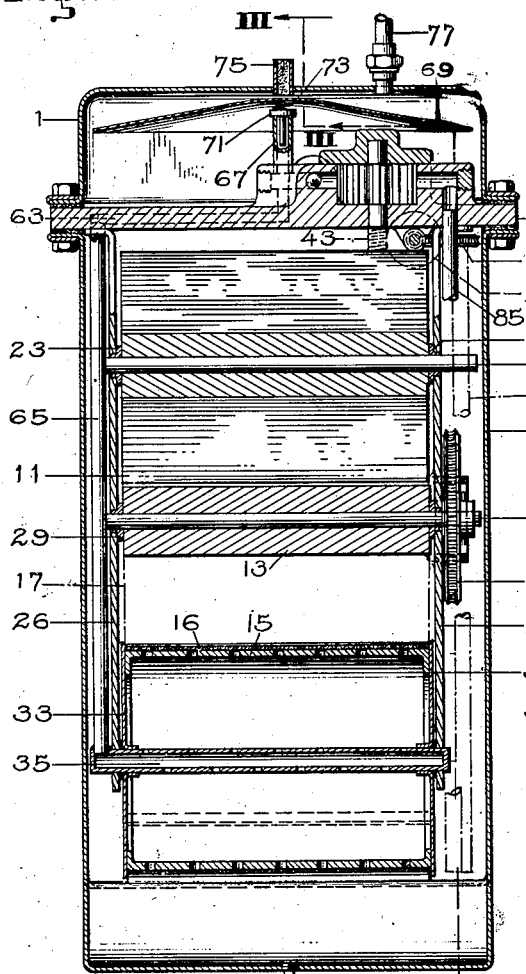
Figure 2 is a sectional elevation of the filter and vaporizer taken on line II—II of Figure 3.
Figure 3:
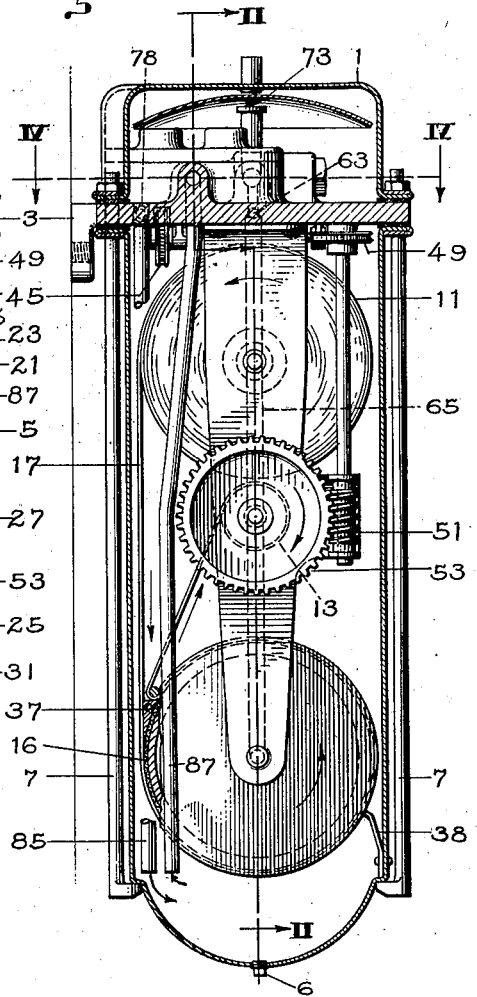
Figure 3 is a side elevation of the filter and vaporizer taken on line III—III of Figure 2.
Figure 4:
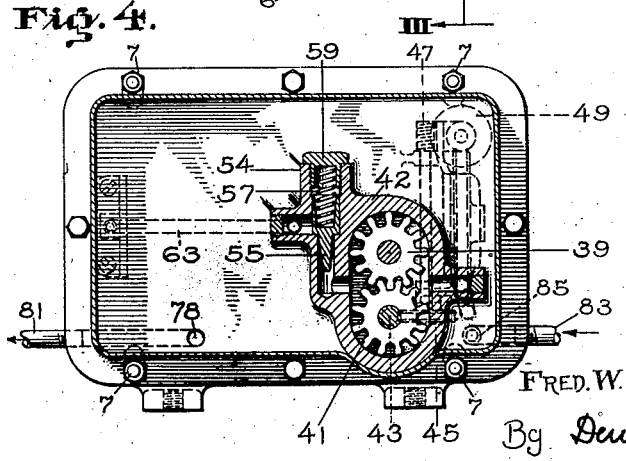
Figure 4 is a sectional plan of the vaporizer taken on line IV—IV of Figure 3.
Figure 5:
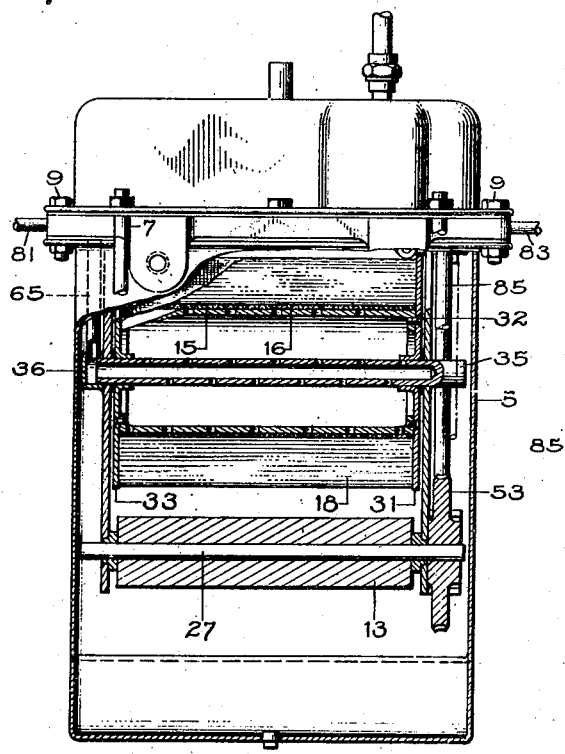
Figure 5 is a rear elevation partially in section of the filter and vaporizer showing a modified form of the filter with one spool eliminated.
Figure 6:
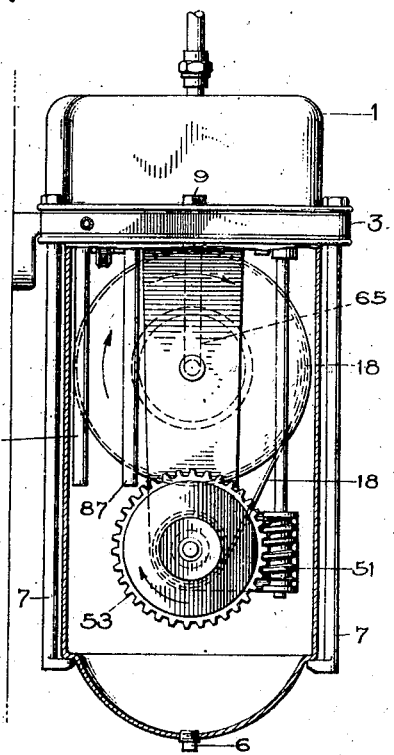
Figure 6 is a side elevation partially in section of Figure 5.

Figures 5 and 6 show a modification of the filtering apparatus shown in Figures 2 and 3 in which the supply spool is eliminated, the storage spool 13 is placed below the filter drum 15 and the supply of filtering fabric 18 is wound upon the filter drum. An open mesh fabric of either fine or coarse threads may be wound upon the filter drum to a depth of many inches and still give a free flow of clear filtrate. The cake solids may be allowed to build up to a predetermined depth and on reaching that depth may be removed while on the filtering belt and wound upon the storage spool and in this way a fresh filtering surface will be exposed whenever the pressure has a tendency to rise. The filtering fabric may be supplied on the drainage screen 16 and may be placed upon the filter drum by dropping the filter casing as described above, withdrawing the filtrate shaft 35, the end of which rotates in connection 36, removing the drum, and taking off the end plate 31 by removing screws 32. The drainage screen with filtering fabric may either rotate on the drum or be fastened to it.

Figure 7:
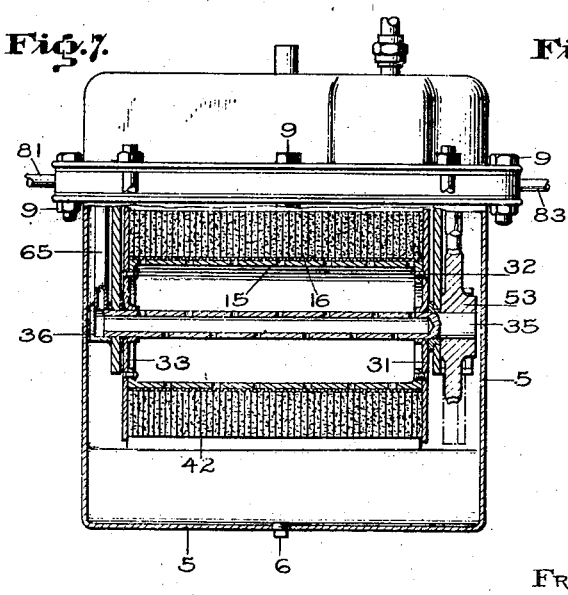
Figure 7 is a rear elevation partially in section of the filter and vaporizer showing a modified form of the filter with both spools eliminated.
Figure 8:
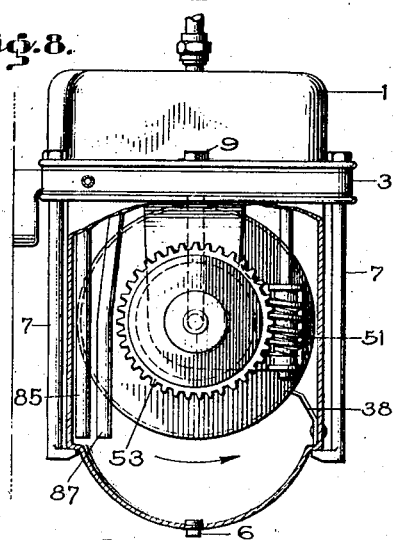
Figure 8 is a side elevation partially in section of Figure 7.

Figures 7 and 8 show another modification of the filtering apparatus in which both spools are eliminated, the filter drum becomes the driven member and a filtering medium 42 in the form of a thick cylindrical wall or a plurality of flat cylindrical rings of porous material such as cotton fibre, asbestos or felt take the place of the belt windings. This fibrous material may be impregnated with or contain, bone char, fuller's earth or similar material for decolorizing purposes. A scraper 38 is provided to remove the cake solids into the sump as required. The cylindrical wall of filtering material may be removed and a new one placed in position in the same manner described for the apparatus shown in Figures 5 and 6.

The operation of the apparatus thus constructed has been in part indicated in connection with the foregoing description. As shown in Figures 1, 2, 3 and 4, oil from the crank case reservoir enters the screen inlet 88 of pump 89, a portion of it going to the crank shaft bearings or other suitable parts of the engine and a portion of it passing up pipe 90 to the heater 91 in or surrounding the exhaust manifold 92 of the engine, where the oil is heated to a point where it will filter freely and the liquid dilutions vaporize readily under conditions existing in the vaporizing chamber. After the oil has been heated to a suitable point as for instance 100° above the temperature of the oil in the crank case, it passes through pipes 93, 83 and 85 into the bottom of the filter.

On entering the lower part of the filter chamber, the oil under pressure and aided by the vacuum existing in the vaporizing chamber, passes through the filtering belt 17 into the filter drum 15 and through filtrate pipes 35 and 65 and passages 63 and 67 and is sprayed into the vaporization chamber. Immediately there is a tendency for the pressure to rise above any predetermined point due to the filling up of the pores of the filtering fabric by impurities or the closing of them by water particles or the covering of the filtering surface with cake solids, a portion of the filter contents will enter pipe 87, be by-passed through the liquid motor and raising the relief valve will unite with the filtrate coming from the filter drum and be sprayed into the vaporizing chamber. Any water entering the filter chamber will almost immediately be by-passed into the vaporizing chamber due to the proximity of the lowest part of the filtering belt to the positions of the inlet and by-passing outlet in the lowest part of the filter chamber.

The by-passing of the liquid will operate the motor, causing the storage spool through suitable reduction gearing, to advance the filtering belt a sufficient amount to again make normal the filtering rate and pressure upon which the motor will cease to move until there is again a tendency for the pressure to rise. The scraper removing collected solids from the filtering fabric will also renew the filtering surface of the fabric and decrease its rate of advance and thereby increase the life of the supply spool. The solids scraped off settle in the sump which may be cleaned out at long intervals, or in order to avoid this trouble the scraper may be eliminated and the solids simply rolled up on the storage spool.

On exhaustion of the supply spool the total length of filtering belt is wound upon the storage spool, thus allowing all of the oil to pass through the filter drum and filtrate outlet connections into the vaporizing chamber. However, indicator 79, which moves out through stuffing box 80 as the storage spool winds up, will indicate when it is time to renew the supply spool without waiting for it to become completely exhausted. When time to renew the supply spool, the four short bolts 9 are taken out and the four long bolts 7 are loosened and their heads turned so that the filter casing will drop down and be supported by the heads and thus catch the drippings. The lowering of the filter casing exposes the filter drum and spools so that the shafts of the latter may be withdrawn. The storage spool is then discarded, the empty supply spool takes its place, a new supply spool is slipped into position, the end of the filtering belt threaded around the filter drum and fastened to the storage spool, and the filter chamber casing replaced.

The spraying of the heated oil in the vaporizing chamber under a slight vacuum from the air intake pipe of the carburetor and the circulation of air from the breather 75 causes the liquid dilution to be vaporized and carried through pipe 77 to the carburetor 94. This slight vacuum is not sufficient to hold the oil in the vaporizer which leaves through opening 78 and pipe 81 and flows by gravity through cooler 99 back to the crank case 100.

It will thus be seen that the present invention provides a new method whereby a standard clarity, a substantially constant pressure and a substantially constant filtering rate may be maintained in a pressure type of filter, and also whereby a lubricating oil may be maintained at a constant viscosity and a constant temperature during use in an internal combustion engine.

It will also be evident that the providing of fresh filtering surface only as required, and the by-passing of the unfiltered water from the filter chamber to the vaporizing chamber will greatly prolong the life of the filtering fabric.

Having thus described our invention, what we claim is:

1. In a filter having a chamber therein, a movable filter member in the chamber, and means whereby a predetermined rise in the liquid pressure in the filter chamber caused by clogging in the filter member will cause the member to move and remove the filtered sediment therefrom.

2. In a filter having a chamber therein, a movable filter member in the chamber, means providing an outlet from the chamber, and means whereby liquid passing from the chamber through such outlet will cause the member to move and remove the filtered sediment therefrom, the arrangement being such that the means is operated when the member becomes clogged a predetermined amount.

3. In a filter having a chamber therein, a movable filter member in the chamber, means providing an outlet from the chamber, and a liquid-operated motor operated by the flow of fluid from the said outlet to move the member and remove the filtered sediment therefrom when the member has become clogged a predetermined amount.

4. In a filter having a filter chamber therein, a filter member in the chamber, a long filter fabric strip rolled onto the member, and means whereby a predetermined rise in the liquid pressure in the filter chamber caused by the collection of sediment on the fabric about the member will cause a portion of the outer fabric with the sediment thereon to be removed and the under layer of fabric to be presented to the liquid to be filtered.

5. In a filter having a filter chamber therein, a filter drum in the chamber, a filter medium carried on the periphery of the drum, a scraper engaging against the filter medium in a manner adapted to scrape the sediment therefrom when the drum is rotated, and means whereby a predetermined rise in the liquid pressure in the filter chamber caused by clogging of the filter medium will cause the drum to rotate.

6. A filtering apparatus for the purpose indicated comprising a closed chamber into which the lubricant to be filtered is supplied under pressure; a filtering belt and a perforate drum on which it is wound, layer upon layer, mounted in said chamber, the drum having drainage connection through its axis to the outlet of the chamber for conducting away the filtrate liquid, a by-pass from the chamber to the outlet and means within the by-pass for causing the withdrawal of the outer layer of the filtering belt as it becomes clogged, to expose the next inner layer to the incoming liquid.

7. A filtering apparatus for the purpose indicated comprising a closed chamber into which the lubricant to be filtered is supplied under pressure, a filtering belt and a perforated drum on which it is wound, layer upon layer, mounted in said chamber, the drum having drainage connection through its axis to the outlet of the chamber for conducting away the filtrate, a by-pass from the chamber to the outlet, a take-up spool in the chamber to which the filtering belt is connected for unwinding from the drum, and means within the by-pass for causing the rotation of the spool for winding the belt thereonto from the drum.

8. A filtering apparatus for the purpose indicated comprising a closed chamber into which the liquid to be filtered is supplied under pressure, a filtering belt and a perforate drum on which it is wound layer upon layer mounted in said chamber, the drum having drainage connection through its axis to the exterior of the chamber for conducting away the filtrate, means in the chamber connected with the filtering belt for withdrawing the same from the drum at intervals, one layer at a time, as the same becomes clogged, and operating means for said withdrawing means adapted to be actuated by liquid pressure resulting in the chamber from the clogging of the outer layer of the filtering belt on the drum.

9. A filtering apparatus for the purpose indicated comprising a closed chamber into which the lubricant to be filtered is supplied under pressure, a filtering belt and a perforate drum on which it is wound, layer upon layer, mounted in said chamber, the drum having drainage connection through its axis to the exterior of the chamber for conducting away the filtrate; means in the chamber connected with the filtering belt for withdrawing the same from the drum at intervals, one layer at a time as the same becomes clogged, a fluid-actuated motor for operating said withdrawing means, and control means for said motor consisting in a liquid by-pass passage for the liquid to by-pass the closed chamber to reach the motor upon predetermined pressure in the chamber due to the clogging of the filter belt.

10. A filtering apparatus for the purpose indicated comprising a closed chamber into which the lubricant to be filtered is supplied under pressure; a filtering element and a perforated drum on which said element is carried mounted in said chamber, the drum having drainage connection through its axis to the exterior of the chamber for conducting away the filtrate; means operated by the pressure in the chamber for rotating the drum, and means co-operating with the rotating drum for removing a surface layer of the filtering element therefrom, whereby said removal is effected at a rate automatically governed by the increase of pressure in the chamber due to the clogging of the filter element.

11. A process of filtering liquid consisting in supplying the liquid to a filter chamber; providing for its egress from the chamber transversely through a spiral filtering element; removing a surface layer of the filtering element at a rate corresponding to the increase of pressure in the chamber above a predetermined limit, due to the clogging of the filtering element.

12. A filtering process consisting of passing a fluid transversely through a spiral filter member, and removing the fluid inlet surface portion of the member to provide fresh filtering surface to the fluid to be filtered, the rate of the said removal maintaining the filtering pressure substantially constant.

13. A filtering process consisting of passing a fluid through a filter member having a plurality of contiguously and comparatively porous material, and removing the fluid inlet surface layer of the member to provide fresh filtering surface to the fluid to be filtered, the rate of the said removal maintaining the filtering pressure substantially constant.

14. In a filter having a chamber therein, a filter member in the chamber having a plurality of contiguous layers of comparatively porous material, and a cooperating means to remove the fluid inlet surface portion of the member with the solids collected thereon, the cooperating means being actuated by the increased pressure resulting from clogging of the inlet surface portion of the member.

15. A filtering process consisting of passing a fluid transversely through a spiral filter member having a plurality of contiguous layers of comparatively porous material, and removing the fluid inlet surface portion of the member to provide fresh filtering surface to the fluid to be filtered, the rate of said removal maintaining the filtering pressure substantially constant.

16. In a filter for liquid, a filter member comprising a plurality of layers of filter fabric; a passage through which the liquid is fed under pressure to the filter member, means operated by the pressure of the liquid supplied for filtering, for removing the filter fabric layer by layer when said pressure reaches a predetermined degree.

17. In a filter for liquid, a filter member comprising a plurality of layers of filter fabric, a casing in which said filter member is contained, a passage leading to said chamber by which the liquid to be filtered is delivered under pressure to the filter member, motor means for removing the filter fabric layer by layer, connections for operating said motor means by the pressure of the liquid in said delivery passage, and means controlling the access of said pressure to the motor adapted to admit the same upon the pressure reaching a predetermined degree.

18. In a filter for liquid, a filter member comprising a plurality of layers of filter fabric, a passage by which the liquid to be filtered is delivered under pressure to the filter member, a branch from said passage by-passing the filter member, a fluid pressure motor situated in said by-pass passage, a valve controlling the admission of the liquid to said by-pass passage adapted to be opened at predetermined pressure of the liquid, for admitting liquid to the motor for operating the same, and means actuated by the motor for removing the filter fabric layer by layer; whereby such removal is effected when the layer to be removed becoming clogged to a degree requiring pressure in excess of the predetermined degree to force the liquid through such clogged layer causes the pressure in the supply passage to reach that degree.

19. In a filtering system, a filtering apparatus comprising a chamber arranged for fluid flow connection with a source of lubricant and also for fluid flow connection with a mechanism to be lubricated; a filtering element consisting of a plurality of layers of filter fabric interposed in said chamber between said connection, said chamber having a passage leading therefrom at a point anterior to the filtering element, said passage being also arranged for fluid flow connection with the liquid source and thereby by-passing the filtering element; a fluid-operated motor located in said last mentioned passage; a valve which controls admission of the liquid from the chamber to said passage and thereby to the motor, adapted to be opened for such admission upon predetermined pressure of the liquid in the chamber; means for removing the filter fabric layer by layer, and operating connections from the motor for actuating said means.

20. A filtering apparatus comprising a chamber arranged for fluid flow connection with a source of lubricant and also for fluid flow connection with a mechanism to be lubricated; a filtering element consisting of filtering layers accumulated in the chamber for exposing a surface layer to the liquid to be filtered, and a spool on which the fabric constituting said layers is wound to withdraw a surface layer and expose a succeeding layer, said filtering element and spool being interposed in the chamber between the two connections mentioned, said chamber having a passage leading therefrom at a point anterior to the filtering element, said passage being also arranged for fluid flow connection with the fuel source, and thereby by-passing said filtering element and spool, a fluid-operated motor in said last mentioned passage; operating connections from the motor to the spool for rotating the latter to wind the filter fabric on the spool and withdraw it from filtering position in the filtering member, a valve controlling said passage adapted to be opened by predetermined pressure of the liquid; whereby the motor is operated by the pressure of the liquid obtaining access to said by-pass passage when the clogging of the surface layer of the filter member causes the pressure in the passage leading to the latter to reach the predetermined degree for forcing access to the motor.

FRED W. MANNING.
HORACE L. HIRSCHLER.